US012637900B2

(12) United States Patent
Loughney et al.

(10) Patent No.: US 12,637,900 B2
(45) Date of Patent: May 26, 2026

(54) ARTICLE OF WEATHER STRIPPING

(71) Applicant: ULTRAFAB, INC., Farmington, NY (US)

(72) Inventors: David M. Loughney, Phelps, NY (US); Todd M. Clemons, Canandaigua, NY (US)

(73) Assignee: ULTRAFAB, INC., Farmington, NY (US)

( * ) Notice: Subject to any disclaimer, the term of this patent is extended or adjusted under 35 U.S.C. 154(b) by 0 days.

(21) Appl. No.: 16/125,639

(22) Filed: Sep. 7, 2018

(65) Prior Publication Data

US 2019/0078379 A1 Mar. 14, 2019

Related U.S. Application Data

(60) Provisional application No. 62/556,345, filed on Sep. 9, 2017.

(51) Int. Cl.

| | |
|---|---|
| ***E06B 7/22*** | (2006.01) |
| ***E06B 3/263*** | (2006.01) |
| ***E06B 7/23*** | (2006.01) |
| *E06B 3/64* | (2006.01) |

(52) U.S. Cl.

CPC ................ *E06B 7/22* (2013.01); *E06B 3/263* (2013.01); *E06B 7/2314* (2013.01); *E06B 3/645* (2013.01)

(58) Field of Classification Search

CPC . E06B 7/22; E06B 3/645; E06B 3/263; Y10T 428/23929; Y10T 428/23979; D06N 3/0011; D06N 3/045; D06N 2213/03

See application file for complete search history.

(56) References Cited

U.S. PATENT DOCUMENTS

| | | | | |
|---|---|---|---|---|
| 3,175,256 A | | 3/1965 | Horton | |
| 3,266,190 A | | 8/1966 | Jackson | |
| 3,404,487 A | | 10/1968 | Johnson | |
| 3,481,802 A | | 12/1969 | Marcell | |
| 3,616,137 A | | 10/1971 | Horton | |
| 3,677,851 A | | 7/1972 | Kayser | |
| 3,745,053 A | * | 7/1973 | Johnson | D04H 11/00 428/88 |
| 3,836,421 A | | 9/1974 | Terry et al. | |
| 3,935,043 A | | 1/1976 | Kessler | |
| 4,148,953 A | | 4/1979 | Horton | |
| 4,164,599 A | | 8/1979 | Kessler | |
| 4,244,074 A | | 1/1981 | Barcikowski et al. | |
| 4,288,483 A | | 9/1981 | Miska et al. | |
| 4,302,494 A | | 11/1981 | Horton | |
| 4,352,845 A | | 10/1982 | Miska | |
| 4,367,254 A | | 1/1983 | Franklin et al. | |
| 4,551,376 A | * | 11/1985 | Kessler | E06B 7/2314 428/92 |
| 4,699,818 A | | 10/1987 | Evans et al. | |

(Continued)

FOREIGN PATENT DOCUMENTS

| | | | |
|---|---|---|---|
| CA | 2 198 597 | | 3/1996 |
| JP | 2003328660 A | * | 11/2003 |

*Primary Examiner* — Larissa Rowe Emrich

(74) *Attorney, Agent, or Firm* — Kenneth J. LuKacher Law Group; R. S. Rosenholm

(57) ABSTRACT

The invention provides for an article of manufacture, being an improved weather strip and dust plug. The invention also provides for an apparatus, system and method for manufacturing the improved weather strip and dust plug.

7 Claims, 13 Drawing Sheets

(56) References Cited

U.S. PATENT DOCUMENTS

| | | | | |
|---|---|---|---|---|
| 4,713,130 | A | 12/1987 | Evans et al. | |
| 4,970,829 | A | 11/1990 | Brautigam | |
| 5,060,422 | A | 10/1991 | Horton | |
| 5,093,181 | A | 3/1992 | Sanchez | |
| 5,338,382 | A | 8/1994 | Johnson et al. | |
| 5,384,976 | A * | 1/1995 | Hall | B29C 65/30 428/95 |
| 5,438,802 | A | 8/1995 | Johnson | |
| 5,447,590 | A | 9/1995 | Gilpatrick | |
| 5,472,762 | A | 12/1995 | Edwards et al. | |
| 5,681,637 | A | 10/1997 | Kessler et al. | |
| 5,807,451 | A | 9/1998 | Johnson | |
| 5,817,390 | A | 10/1998 | Johnson | |
| 5,906,877 | A | 5/1999 | Popper et al. | |
| 6,024,815 | A | 2/2000 | Norton | |
| 6,115,566 | A | 9/2000 | Ohara et al. | |
| 6,252,757 | B1 | 6/2001 | Loughney et al. | |
| 6,878,428 | B2 | 4/2005 | Hope | |
| D523,274 | S | 6/2006 | Miyoshi | |
| 7,172,006 | B2 | 2/2007 | Day et al. | |
| 7,335,412 | B2 | 2/2008 | Wylie | |
| 7,727,350 | B2 | 6/2010 | Hawkins et al. | |
| 7,829,174 | B2 | 11/2010 | Kanzaki et al. | |
| 7,896,995 | B2 | 3/2011 | Wylie et al. | |
| 8,367,181 | B2 | 2/2013 | Chernyak et al. | |
| 8,376,471 | B2 | 2/2013 | Chanthabane et al. | |
| 2004/0074719 | A1 * | 4/2004 | Loughney | E06B 7/22 188/267.1 |
| 2005/0129905 | A1 | 6/2005 | Veenema et al. | |
| 2006/0057329 | A1 * | 3/2006 | Day | E06B 7/22 428/95 |
| 2007/0014966 | A1 | 1/2007 | Day et al. | |
| 2008/0063831 | A1 * | 3/2008 | Kanzaki | E06B 7/22 156/72 |
| 2009/0078377 | A1 * | 3/2009 | Ohara | E06B 9/582 160/127 |
| 2009/0094899 | A1 | 4/2009 | Loughney et al. | |
| 2009/0258184 | A1 | 10/2009 | Pawson et al. | |
| 2010/0170160 | A1 * | 7/2010 | Albanese | E06B 7/2307 49/506 |
| 2013/0236684 | A1 | 9/2013 | Loughney et al. | |

* cited by examiner

ARTICLE OF WEATHER STRIPPING

This document is a United States Non-Provisional utility patent application under statute 35 U.S.C. 111(a).

CROSS REFERENCE TO RELATED PATENT APPLICATIONS

This document is a United States Non-Provisional utility patent application that claims priority and benefit under 35 U.S.C. 119 (e) to U.S. (utility) provisional patent application having Ser. No. (62/556,345) (Confirmation No. 6213), that was filed on Sep. 9, 2017 and that is entitled "IMPROVED ARTICLE OF WEATHER STRIPPING", and which is incorporated herein by reference in its entirety.

PATENT APPLICATION(S) INCLUDING RELATED SUBJECT MATTER

This document includes subject matter generally related to that of U.S. Pat. No. 4,302,494 to Robert C. Horton., that was issued on Nov. 24, 1981 and entitled "Pile Weather-stripping", and generally related to U.S. Pat. No. 7,335,412 to Wylie, that was issued on Feb. 26, 2008 and entitled "Pile Weatherstripping Dust Plugs", and generally related to U.S. Patent Publication No. 2007/0014966 to Day et al., that was published on Jan. 18, 2007 and entitled "Pile Weather Stripping Dust Plugs", and generally related to U.S. Patent Publication No. 2013/0236684 to Loughney et al., that was published Sep. 12, 2013 and entitled "Pile Weather-stripping . . . Polypropylene". All of the aforementioned patents, patent publications and other publications are herein incorporated by reference in their entirety.

BACKGROUND OF THE INVENTION

A dust plug is an article of manufacture that is a form of weather stripping. Types of weather stripping, including dust plugs, are designed to provide a seal against air or water infiltration through openings, such as openings that may exist in vehicles, door frames and window frames, for example. The discussion above is merely provided for general background information and is not intended to be used as an aid in determining the scope of the claimed subject matter.

BRIEF DESCRIPTION OF THE INVENTION

The invention provides for an article of manufacture, being an improved weather strip and dust plug. The invention also provides for an apparatus, system and method for manufacturing the improved dust plug.

This brief description of the invention is intended only to provide an overview of subject matter disclosed herein according to one or more illustrative embodiments, and does not serve as a guide to interpreting the claims or to define or limit the scope of the invention, which is defined only by the appended claims.

BRIEF DESCRIPTION OF THE DRAWINGS

So that the manner in which the features of the invention can be understood, a detailed description of the invention to certain embodiments of the invention is provided herein, some of which are illustrated in the accompanying drawings. It is to be noted, however, that the drawings illustrate only certain embodiments of this invention and are therefore not to be considered limiting of its scope, for the scope of the invention can encompass other equally effective embodiments.

The drawings are not necessarily to scale. The emphasis of the drawings is generally being placed upon illustrating the features of certain embodiments of the invention. In the drawings, like numerals are used to indicate like parts throughout the various views. Differences between like parts may cause those parts to be indicated with different numerals. Unlike parts are indicated with different numerals. Thus, for further understanding of the invention, reference can be made to the following detailed description, read in connection with the drawings in which.

DETAILED DESCRIPTION OF THE INVENTION

Figure 1A:
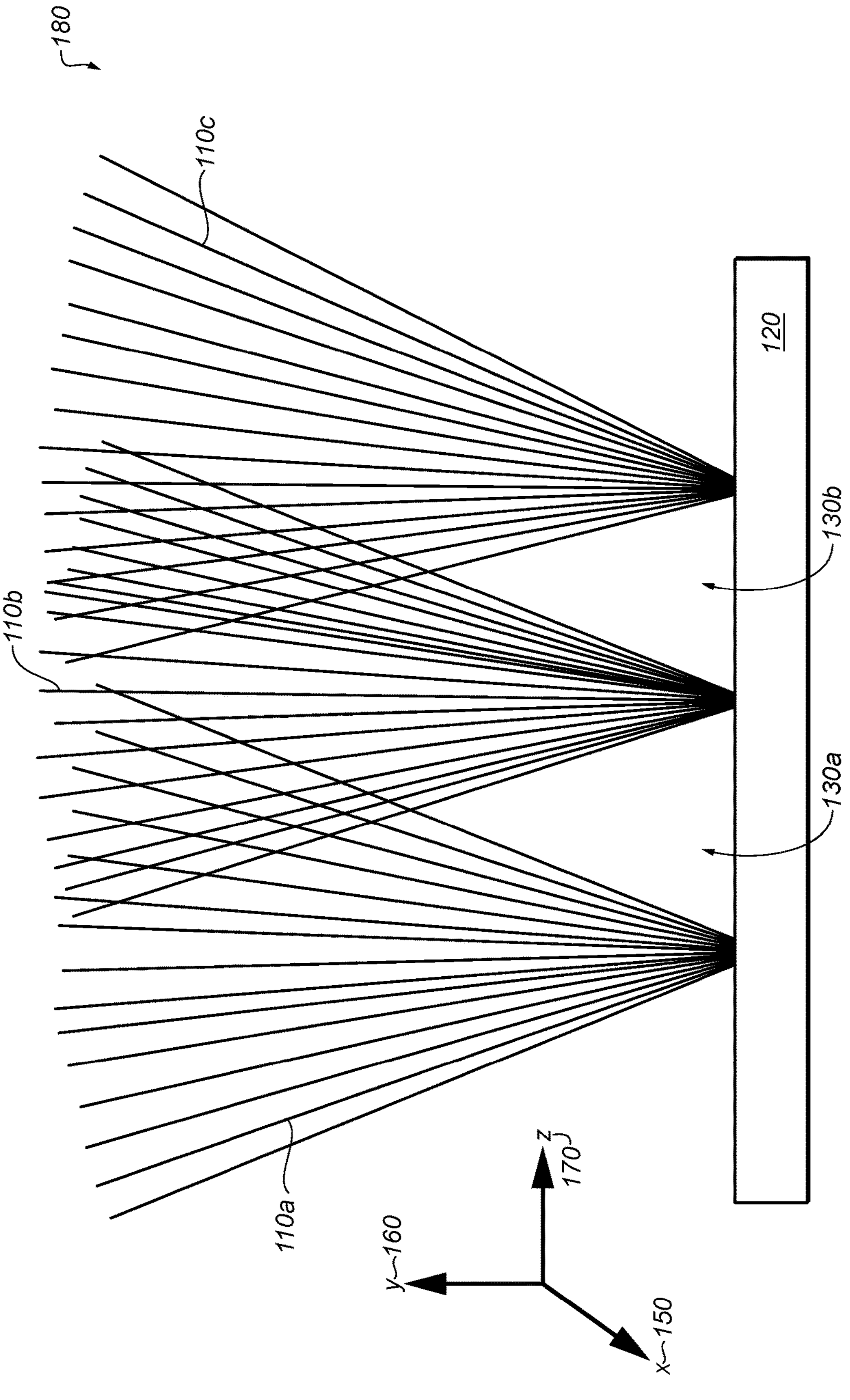
FIG. 1A (PRIOR ART)
FIG. 1A illustrates an article of weather stripping that includes a backing layer and a pile of filaments that are woven through the backing layer.

FIG. 1A illustrates an article of weather stripping that includes a backing layer 120 and a pile of filaments 110 that are woven into and through the backing layer 120. As shown, each groups of filaments 110*a*-110*c*, each also referred to herein as a filament group, protrude upward from the backing layer 120.

In this embodiment, the backing layer 120 has a thickness of about 30/1000 of an inch. Typically, a backing layer has a thickness of 30/1000 of an inch or larger. Each filament is woven through the backing layer 120 and in a fashion where each filament passes through the backing layer in a "U" shaped fashion, where a lower curved portion of the "U" shape of each woven filament passes below a lower surface of the backing layer 120 and two upper sides of the "U" shape of each woven filament each protrude upward and away from an upper surface of the backing layer.

Each group of filaments 110*a*-110*c* has a span that widens horizontally (spreads apart along a plane that is perpendicular to the Y axis 160) as a function of distance above the backing layer 120 from which each filament group 110*a*-110*c* is attached. As shown, there is an air gap 130*a*-130*b* that is located along the upper surface of the backing layer and located between each adjacent pair within the filament groups 110$a$-110$c$. Each air gap is referred to herein as a "corn row" 130$a$-130$b$.

Corn row 130$a$ is located in between filament grouping 110$a$ and 110$b$ and has a long dimension that is directed parallel the X axis 150, as shown here. Corn row 130$b$ is located in between filament grouping 110$b$ and 110$c$ and also has a long dimension that is directed parallel the X axis 150. These corn rows 130$a$-130$b$ are being viewed from a viewing direction that is parallel to the X axis 150. In this embodiment, corn rows are not visible when being viewed from a viewing direction that is parallel to the Z axis 170 direction. Note that weather stripping as typically installed, can be subject to about a 25% compression via a compression force, which in some circumstances can cause such corn rows to widen.

Weather stripping is employed for the purpose of obstructing a flow of air, water or other fluids and/or particulates through a passageway. Such a passageway can reside within various manufactured products, such as within an automobile, or a door or window frame. Weather stripping can be cut into various shapes and sizes in order to fit into and effectively obstruct a particular passageway. Some passageways are also referred to herein as voids or crevices.

Generally, weather stripping is dimensioned to be long and narrow in shape. The long dimension being typically wound around a spool in lengths of hundreds of feet, and as a result, individual weather strips can be cut from such a spool to a desired length. As shown here, this long dimension is measured parallel to the X axis 150.

A width dimension of a woven weather strip can range from a fraction of an inch to many (3-5) inches. As shown here, the width dimension of this weather stripping is measured parallel to the Z axis 170.

A depth dimension of a woven weather strip is typically a fraction of an inch. As shown here, a thickness (depth) dimension of this weather stripping is measured parallel to the Y axis 160. Note that a thickness of a backing layer 120 of woven weather stripping, is typically made from a material having a thickness of $^{30}/_{1000}$ of an inch or greater, in order to sufficiently reduce a risk of the backing layer 120 tearing (breaking) apart from the numerous penetrations of the backing layer 120 caused by the weaving of the filaments into and back through the backing layer 120.

One disadvantage of woven weather stripping is that filaments can be separated from the backing layer 120, simply by being physically grabbed and pulled through and away from the backing layer 120 via action of a human hand. In other words, pulling one upward end of the "U" shaped filament upward, can cause the other upward end of the "U" shaped filament to lower and be pulled entirely through the backing layer 120. To mitigate this problem, some woven weather stripping is further manufactured with one or more adhesives to resist such easy separation of filaments from the backing layer 120.

Dust plugs are effectively shorter length portions of weather stripping, and are typically cut from weather stripping. Dust plugs typically have a width dimension that is equal to the width dimension of weather stripping from which the dust plug was cut. However, other cutting patterns can be employed. Typically, dust plugs have overall dimensions that are more proximate in size to each other as compared to weather stripping.

When weather stripping is cut and installed into a passageway, such a portion of weather stripping is installed so that the long dimension of any corn rows 130$a$-130$b$ is disposed perpendicular to the expected flow of air within that passageway, and perpendicular to the direction of filaments attached to the weather stripping. In other words, such weather stripping is preferably installed so that the flow of air is directed along the Z axis 170 of the weather stripping, as shown in this figure.

For example, the height of the pile and of the backing strip 120 combined is typically about 0.5 inches. Measuring a cross section of a corn row along a plane defined by the Y 160 and Z 170 axes, the height of the corn row 130$a$-130$b$, as measured between an upper surface of the backing layer 120 and an upper peak (upper corner) of the corn row 130$a$-130$b$ is typically 0.15 inches. A width of the corn row 130$a$-130$b$, as measured horizontally along the Z axis 170 and along the upper surface of the backing strip 120 is about 0.10 inches.

Figure 1B:
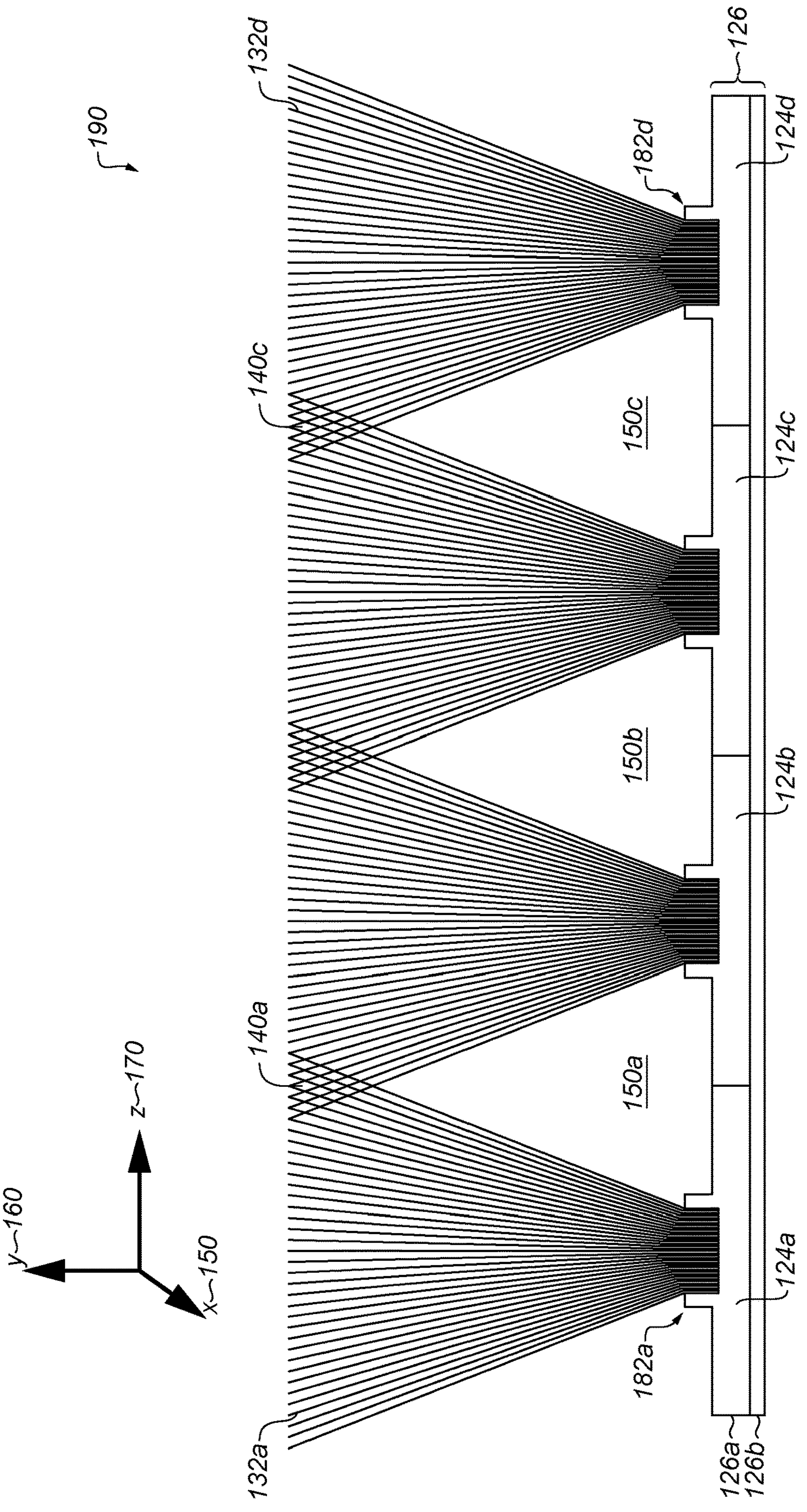
FIG. 1B (PRIOR ART)
FIG. 1B illustrates an article of weather stripping that includes a backing layer employing a filament holders to attach to individual piles of filaments (filament piles).

FIG. 1B illustrates an article of weather stripping that includes a backing layer employing a filament holders to attach to individual piles of filaments.

Figure 7:
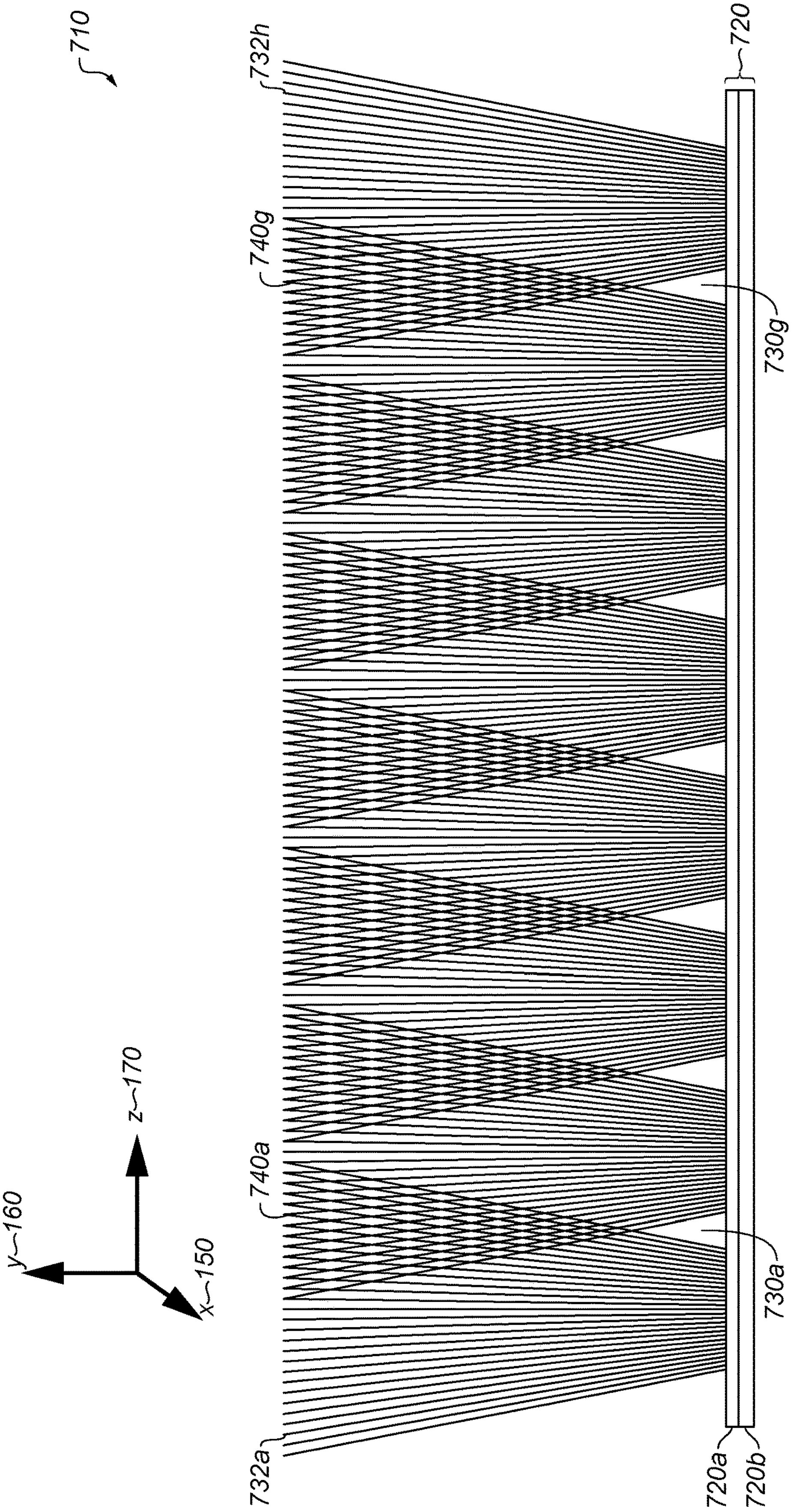
FIG. 7 illustrates manufactured weather stripping in accordance with the invention.

As shown, individual piles of filaments (filament piles) 132$a$-132$d$ are attached to a backing strip 126 and abut each other and form corn rows 150$a$-150$c$ along an upper surface of the backing strip 126. A portion of each filament pile 132$a$-132$d$ is shown to intersect at least one adjacent filament pile 132$a$-132$d$ within a volume of space 140$a$-140$c$. Within each volume of space 140$a$-140$c$, filaments are interleaving with, and pressing and pushing against neighboring filaments, causing more dense clustering of filaments within each marked volume of space 140$a$-140$c$, Also, a corn row 150$a$-150$c$, being a volume of space that is void of filaments, is formed between adjacent filament piles 132$a$-132$d$. In some embodiments, each corn row 150$a$-150$c$ has a maximum width dimension, as measured along the Z axis 170, equal to 0.165 inches, and has a maximum height dimension, as measured along the Y axis 160, equal to 0.225 inches. The size of these corn rows, in terms of cross-section with respect to the Y-Z plane, is substantially than that of the invention, as shown in FIG. 7.

A backing layer 126, includes a sublayer 126$a$ and a sublayer 126$b$. Sublayer 126$a$ includes filament holders 182$a$-182$d$, which are also referred to herein as "pile directors", which each mechanically captures a lower portion of one filament pile 132$a$-132$d$. Each filament pile can be further attached (bonded) to the sublayer 126$a$ via welding (fusing). The sublayer 126$a$, is actually made from individual backing strips 124$a$-124$d$ that are attached to each other to form a wider backing strip 126 along the X-Z plane. Sublayer 126$b$ is attached to sublayer 126$a$ via welding or some other form of adhesion, to form additional structural support of the backing layer as a whole.

The prior art backing layer 126, that is formed in this manner, is stiffer and more rigid (resistant to bending) than the backing layer that is provided by the invention. Such a difference in the bendability is shown in FIGS. 6A-6D.

Figure 2A:
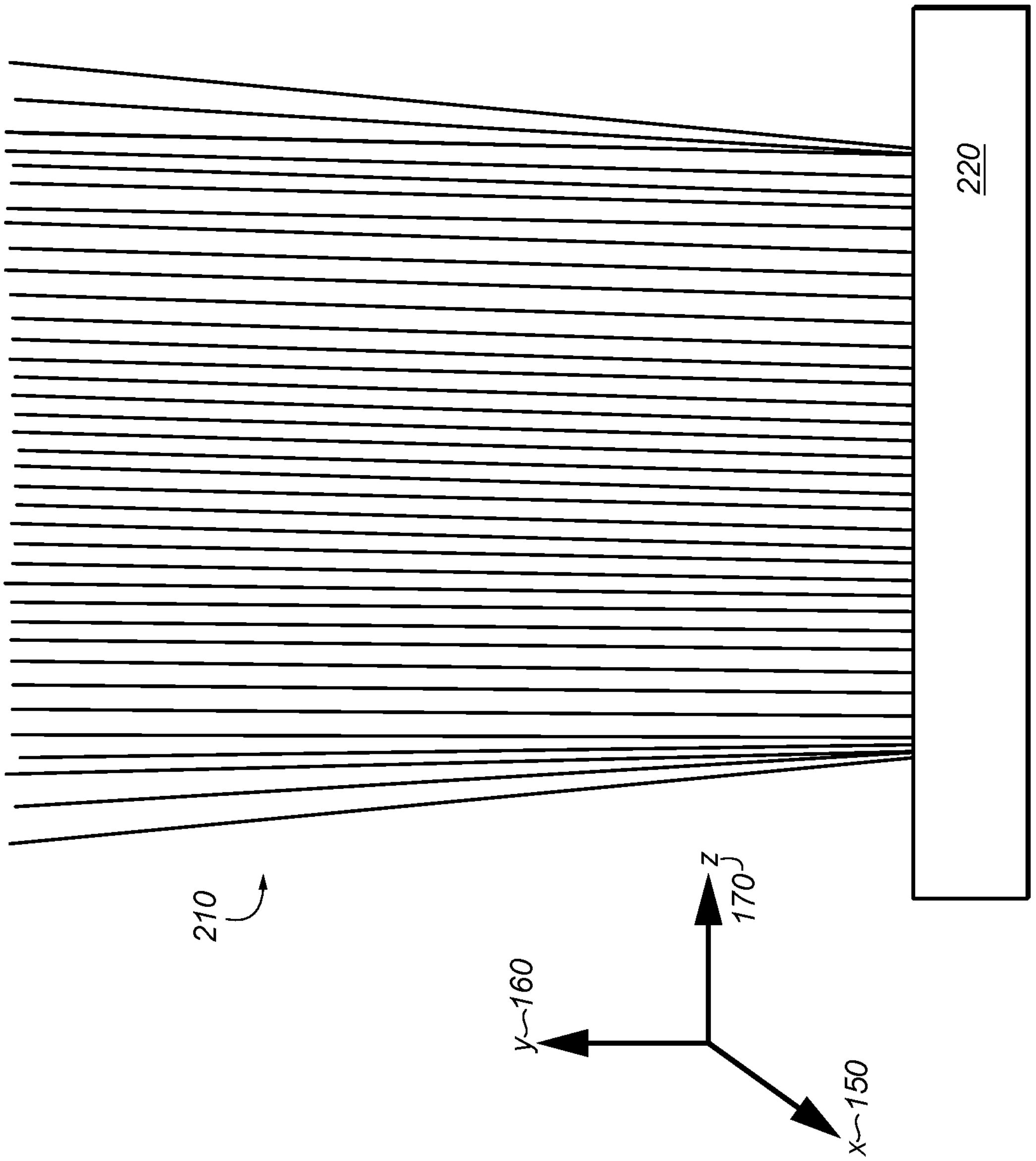
FIGS. 2A-2B each illustrate an article of weather stripping that includes a backing layer that is made from polypropylene material and that is attached via ultrasonic welding to at least one pile of filaments that is made from the same polypropylene material.

FIG. 2A illustrates an article of weather stripping that includes a backing layer 220 that is made from polypropylene material and that is attached via ultrasonic welding to a pile of filaments 210 that is made from polypropylene material. This arrangement is also referred to herein as "poly on poly" weather stripping. As shown here, the filament pile 210, also referred to herein as the filament group 210, protrude upward from the backing layer 220.

In this embodiment, like the backing layer 120 of FIG. 1, this backing layer 220 has a thickness of about $^{30}/_{1000}$ of an inch. Typically, such a poly on poly backing layer 220 has a thickness of $^{30}/_{1000}$ of an inch or larger.

Unlike the backing layer 120 of FIG. 1, none of the filaments 210 are woven into the backing layer 220. These filaments 210 are instead welded (fused) to the backing layer 220 as if the filaments and the backing layer are manufactured as one object made of polypropylene. One advantage of poly on poly weather stripping that is manufactured in this manner is that the filaments do not shed, meaning that such filaments to not separate from the backing layer over time, which can happened with filaments that are woven into the backing layer. Furthermore, filaments cannot be pulled away from the backing layer 220 via gripping and pulling via fingers of the human hand, without breaking any of the filaments. Such filaments cannot be pulled away from the backing layer 220, unlike some embodiments of woven filaments like the woven filaments 110 of FIG. 1.

However, one disadvantage of the backing layer 220 is, that in accordance with its manufacturing process, it is manufactured one continuous section (strip) of filaments on a strip of backing layer, at a time, meaning that multiple individual strips of poly on poly weather stripping must be manufactured and then somehow joined along a long dimensional edge to form weather stripping having a combined wider dimension as measured with respect to the Z axis 170.

Method(s) for manufacturing such individual weather strips is described in the U.S. Pat. No. 4,302,494 to Horton and in U.S. Patent Publication No. 2013/0236684 to Loughney, both of the aforementioned references are each herein incorporated by reference in their entirety.

Figure 2B:
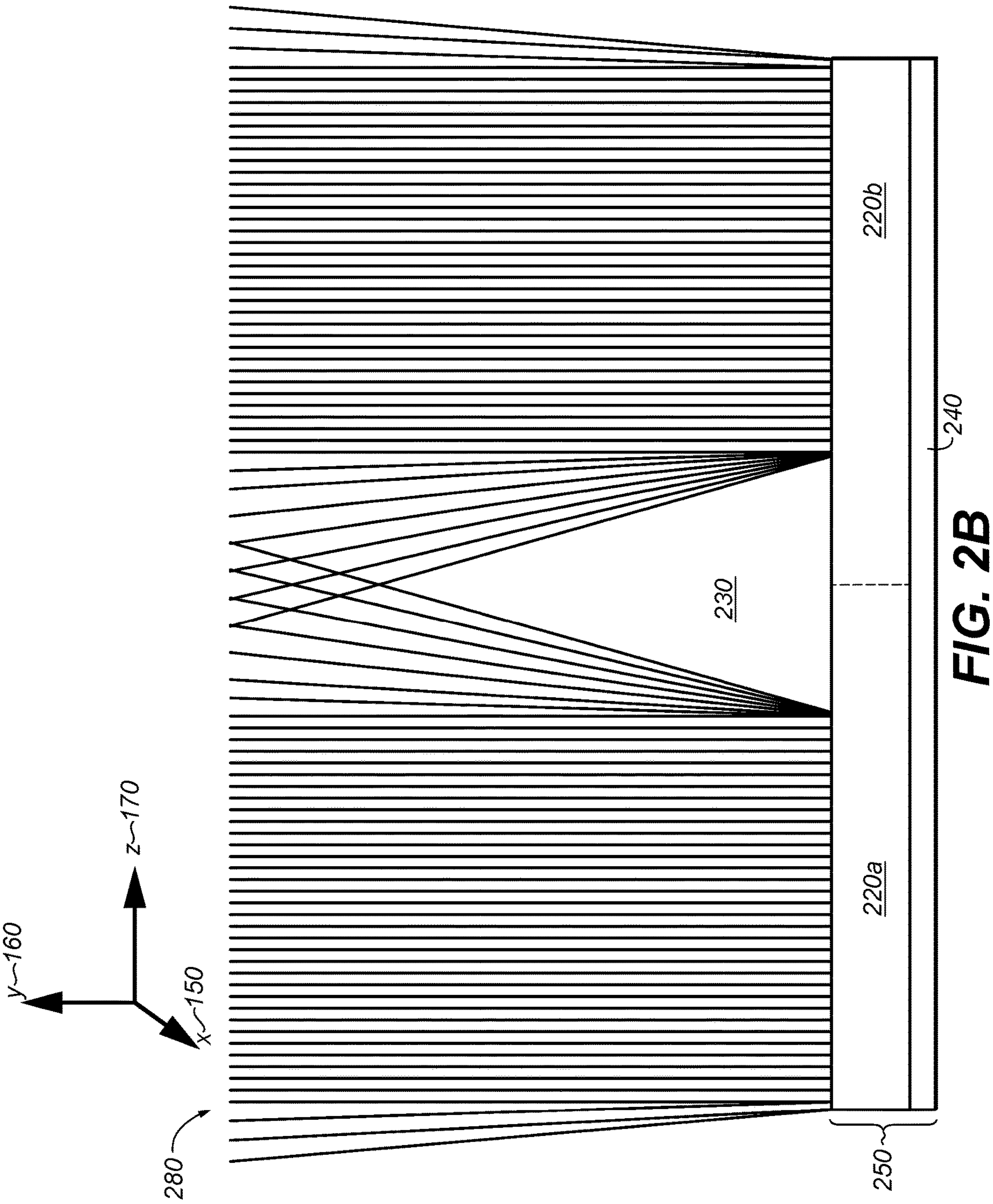

FIG. 2B illustrates a joining of (2) articles of weather stripping, like that shown in FIG. 2A into wider weather stripping article, also referred to herein as an elongated (widened) dust plug 280. As shown, each backing 220*a* and 220*b*, are joined "end to end" with each other. To provide further structural support of the joining of the two backing layers 220*a*-220*b*, an additional backing layer 240 is further attached below the lower surface of the joined backing layers 220*a*-220*b*, to form a combined backing layer 250 having a thickness of about 40/1000 of an inch. As shown, a corn row 230 is formed from the joining of these two "poly on poly" weather strips.

For example, the height of the pile and of the backing strip 250 combined is typically about 0.51 inches. Measuring a cross section of a corn row along a plane defined by the Y 160 and Z 170 axes, the height of the corn row 130*a*-130*b*, as measured between an upper surface of the backing layer 120 and an upper peak (upper corner) of the corn row 130*a*-130*b* is typically 0.30 inches. A width of the corn row 130*a*-130*b*, as measured horizontally along the Z axis 170 and along the upper surface of the backing strip 120 is about 0.15 inches.

Figure 3:
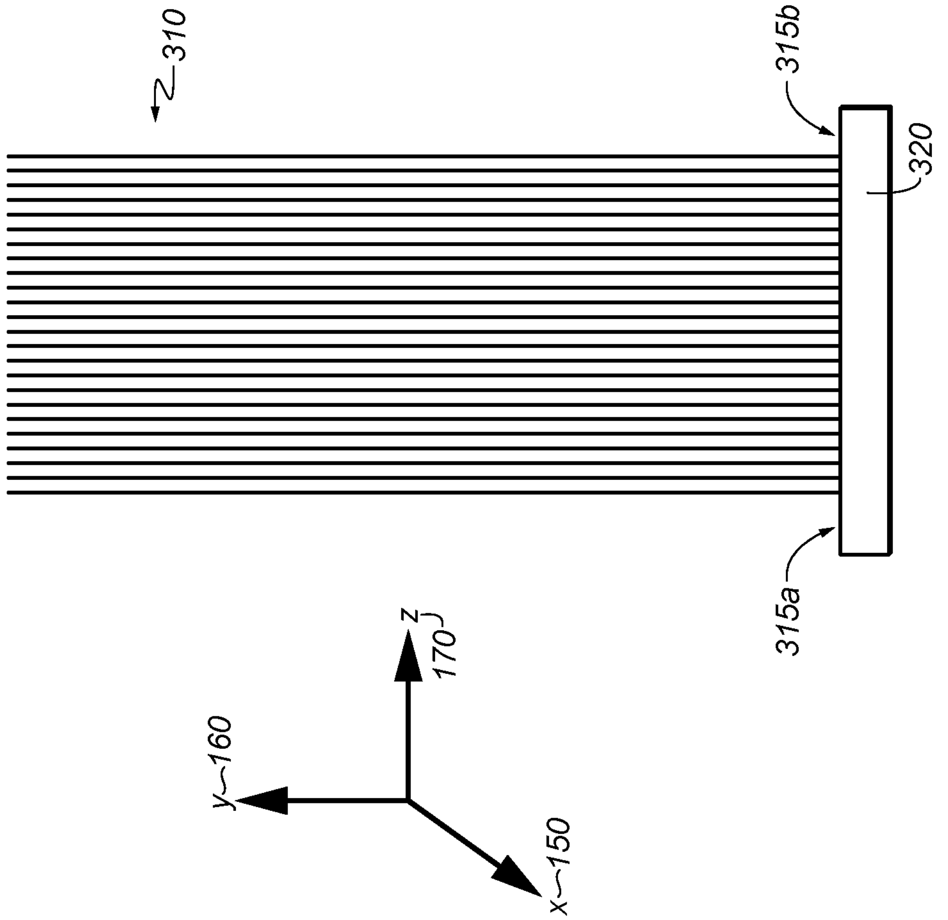
FIG. 3 illustrates an improved article of weather stripping that includes a thin backing layer that is made from polypropylene material and that is attached via ultrasonic welding to a pile of filaments, and where the pile of filaments are also made from polypropylene material.

FIG. 3 illustrates an improved article of weather stripping that includes a thin backing layer 320 that is made from polypropylene material and that is attached via ultrasonic welding (fusing) to a pile of filaments that is also made from polypropylene material. Like the articles of FIGS. 2A-2B, this arrangement is also referred to herein as "poly on poly" weather stripping.

This embodiment, unlike the backing layer 120 of FIG. 1 and unlike the backing layer 220 of FIGS. 2A-2B, has a backing layer 320 of a reduced thickness of about 12.5/1000 of an inch. This backing layer 320 has a thickness of less than half of a thickness of a typical weather stripping backing layer, such as of FIGS. 1 and 2A-2B.

Like the weather stripping of FIGS. 2A-2B, these filaments 210 are welded (fused) to the backing layer 320 as if the filaments and the backing layer 320 are manufactured as one object made of polypropylene. Also like the article of FIG. 2A, weather stripping having the backing layer 320 is manufactured one strip at a time, meaning that multiple individual strips of this embodiment of poly on poly weather stripping are joined along a long dimensional edge to form weather stripping having a combined wider dimension as measured with respect to the Z axis 170.

One advantage of employing this thin backing layer 320 is that it is substantially more flexible than the backing layers of FIG. 1 and FIGS. 2A-2B, as illustrated in FIGS. 6A-6D. Another advantage of employing this thin backing layer 320, is that it can be joined using a method that provides a substantial reduction to corn row sizing as compared to the end to end method of joining the "poly to poly" backing layer 250 as shown in FIG. 2B.

In a preferred embodiment, the backing layer 320 is a non-woven polypropylene film, that is (being) a non-woven polypropylene fabric that is extrusion coated with a layer of polypropylene (PP) on at least one of its sides, and that is supplied by Arlin Manufacturing of Lowell, Massachusetts. This backing layer 320 has a thickness (as measured parallel along the Y axis 160) of about 12.5/1000 of an inch and is cut to a width (as measured parallel along the Z axis 170) of about 110/1000 of an inch. Its length (long dimension) (as measured parallel along the X axis 150) is spooled so that it can be cut to desired lengths along its long dimension, which is shown in FIG. 3 as being parallel to the X axis 150. Its width is shown in FIG. 3 as being parallel to the Z axis 170.

The 110/1000 of an inch width of the backing layer 320 is further divided into a pile attachment section 310, occupying a width of 80/1000 of an inch as measured parallel to the Z axis 170 and which is centered within the width of the backing layer 320, and two pile non-attachment sections 315*a*-315*b* each having a width of 15/1000 of an inch and located adjacent to and on opposite sides of the pile attachment section 310. These pile non-attachment sections 315*a*-315*b* act like (side) margins of the backing layer 320 that surround and protrude laterally and in a direction that is parallel to the Z axis 170, beyond the pile attachment section 310 along the width direction of the weather stripping.

The pile attachment section 310, also referred to herein as a filament pile attachment section, in combination with a pile (filament pile) non-attachment section 315*a*, can be defined to form (1) spatial pattern, and optionally can reside as (1) cycle within a plurality of adjacent cycles of spatial patterns, along the Z 170 axis.

In the above described circumstance, (1) pile attachment section occupies 80/1000 of an inch, as measured along the Z axis 170, while an adjacent the non-attachment section 315*a* occupies 15/1000, as measured along the Z axis 170. As a result, the filament pile attachment section occupies more than (5) times as much length along the Z axis 170, and occupies more than (5) times the area of the backing layer 320, in relation to the adjacent pile (filament pile) non-attachment section.

In accordance with the invention, multiple weather strips that are made from a thin backing can be joined via their pile non-attachment sections 315*a*-315*b* along the long dimension (as measured parallel along the X axis 150) of each weather strip to create a joined weather strip having a larger (wider) width dimension (as measured parallel along the Z axis 170). Such wider weather stripping, can function as an elongated dust plug that can be cut in a direction that is parallel to the Z axis 170 to make individual dust plugs, each having a width that is as wide as a wider joined weather strip and wider than the width of an individual weather strip. These individual dust plugs can have overall dimensions that are more proximate in size to each other (more squarely shaped), as compared to the typically long and narrow dimensions of weather stripping.

Figure 4A:
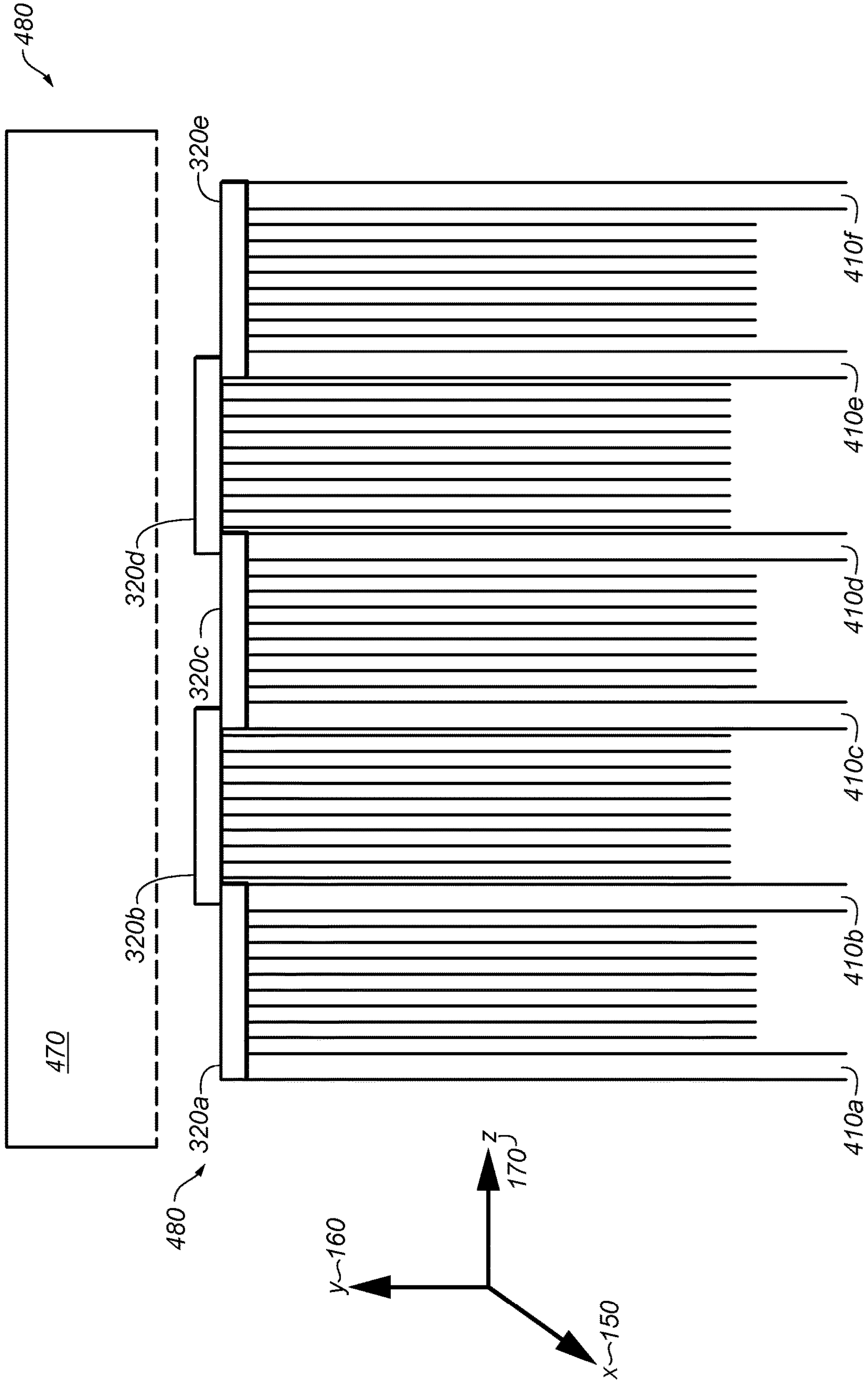
FIGS. 4A-4B illustrate views of an apparatus for joining individual weather strips into a wider combined weather strip.
Figure 4B:
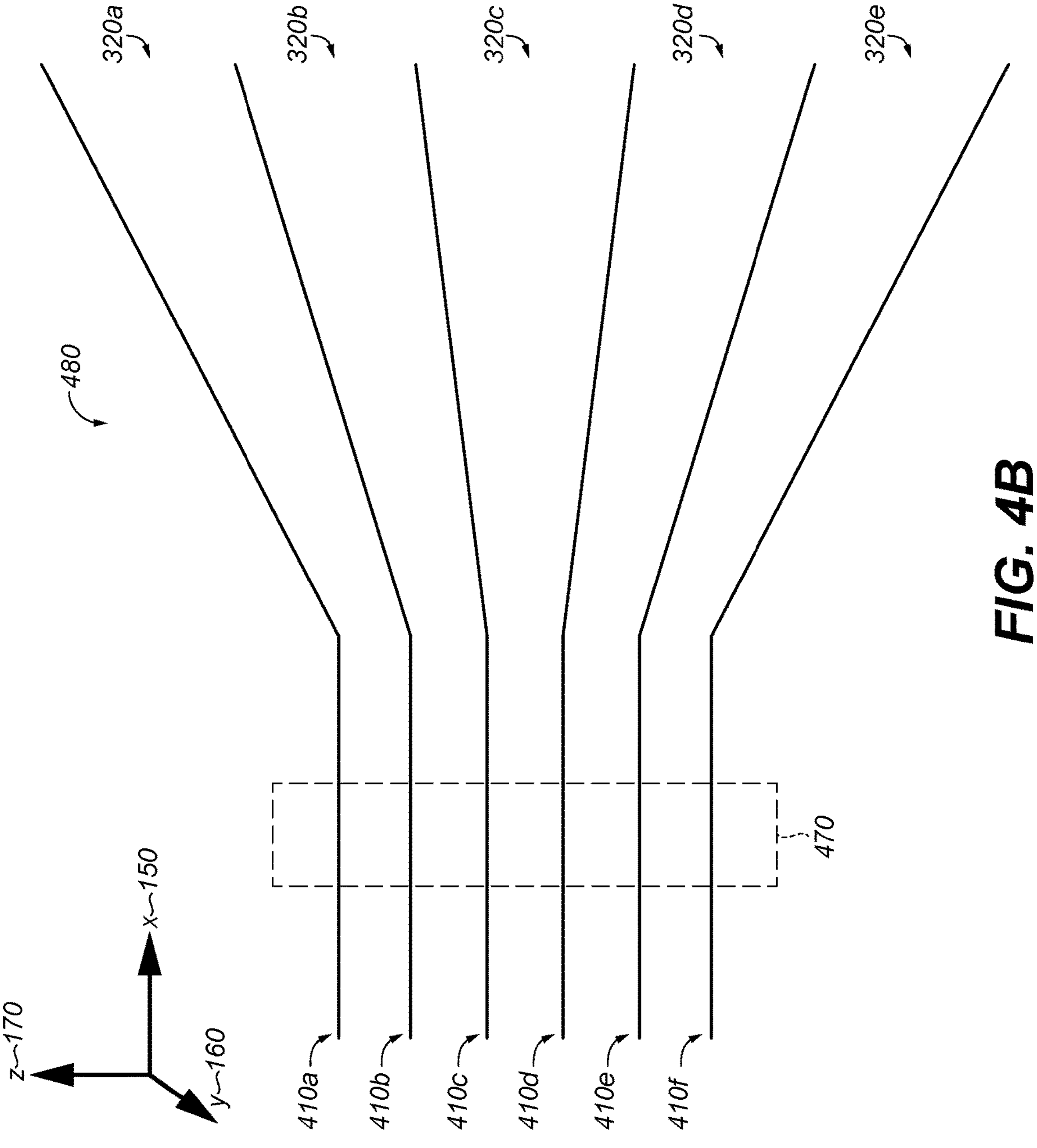

FIGS. 4A-4B illustrate views of an apparatus 480 for joining weather strips. FIG. 4A illustrates a discharge side view of an apparatus 480 for joining weather strips. FIG. 4B illustrates a top-down view of the apparatus 480 for joining weather strips. A joined weather strip is made by side by side joining of multiple weather strips 320*a*-320*e*, which are each like that of the weather strip 320 of FIG. 3. A joined weather strip can function as an elongated dust plug that can be cut into individual dust plugs. As shown, each weather strip 320*a*-320*e* is disposed in an orientation that is upside-down relative to the orientation of the weather strip 320 that is shown in FIG. 3.

Each weather strip 320*a*-320*e* is supported from gravity by an adjacent pair of rails within the set of rails 410*a*-410*f* (See FIG. 4B). Each adjacent pair of the set of rails 410*a*-410*f* each makes direct physical contact with a pile non-attachment section of a weather strip 320*a*-320*e*. As shown, weather strip 320*a* is supported directly by rails 410*a*-410*b*, weather strip 320*b* is supported indirectly by rails 410*b*-410*c*, weather strip 320*c* is supported directly by rails 410*c*-410*d*, weather strip 320*d* is supported indirectly by rails 410*d*-410*e*, and weather strip 320*e* is supported by rails 410*e*-410*f*. As shown, weather strip 320*b* is stacked on top of weather strips 320*a* and 320*c*. Weather strip 320*d* is stacked on top of weather strips 320*c* and 320*e*.

Figure 5:
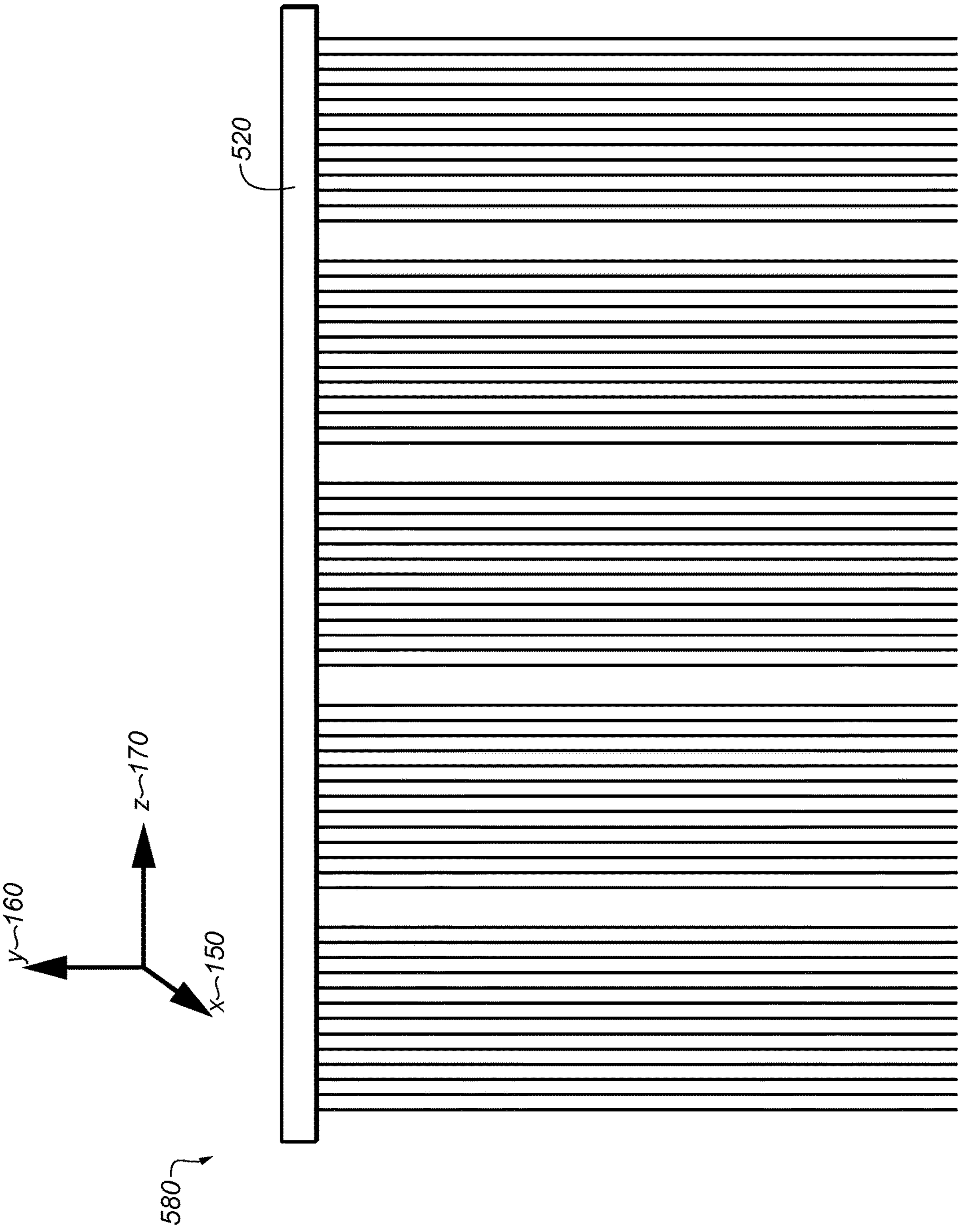
FIG. 5 illustrates a wider combined weather strip (elongated dust plug) joined and discharged via the apparatus of FIGS. 4A-4B.

An ultrasonic welding device (UWD) 470, also referred to as an ultrasonic horn 470 or horn 470 is disposed above the weather strips 320*a*-320*e*, and is configured to press down upon the higher stacked weather strips 320*b* and 320*d*, and to apply vibrational energy that is transferred from the UWD in the form of heat to the higher stacked weather strips 320*b* and 320*d*, in order to melt the higher stacked weather strips 320*b* and 320*d* onto the lower stacked weather strips 320*a*, 320*c* and 320*e*. The joined weather strips 320*a*-320*e* are discharged towards the viewer of this figure and appear as shown in FIG. 5.

In some embodiments, the UWD 470 operates at 20 kilohertz and is pressed at about 48 pounds per inch (psi) down upon the higher stacked weather strips 320*b* and 320*d*. The UWD 470 operates in a cycle that includes lowering the UWD 470 and pressing upon the material to be welded without welding, welding the material, holding the position of the UWD 470 and finally lifting the UWD 470 away from the material being welded, to end a welding cycle.

Note that welding and holding cycle times are dependent upon the type, amount and thickness of material being welded, the melting temperature of the material, the rate of cooling being supplied to the melted material and the amount of cooling required after melting to avoid unintentionally deforming the melted material when moving and/or making physical contact with the material after welding.

In some embodiments, the welding cycle includes welding for about 0.6 seconds and holding without welding for about another 0.35 seconds, prior to lifting the UWD 470 and re-starting the welding cycle. Upon lifting of the UWD 470, the weather strips 320*a*-320*e* advance forward under the UWD 470 and in a direction that is parallel to the X axis and toward the viewer of this figure.

The portions of the weather strips 320*a*-320*e* that were just previously welded are moved forward and discharged from the apparatus 480 as one joined weather strip (See FIG. 5). The welding cycle can then be re-started upon un-welded portions of the weather strips 320*a*-320*e* that are located upstream of the just welded portions of the weather strips 320*a*-320*e* being discharged from the apparatus 480.

FIG. 4B illustrates a top-down view of the apparatus 480 of FIG. 4A. As shown, each pair of rails 410*a*-410*f* defines a passageway for each weather strip 320*a*-320*e* to travel towards the ultrasonic welding device (UWD) 470. Each weather strip 320*a*-320*e* makes physical contact with/(engages) its respective pair of adjacent rails as described in accordance with the textual description of FIG. 4A, and is supported from gravity by that respective pair of rails and slides along that respective pair of rails within the set of rails 410*a*-410*f* prior to being ultrasonically welded by the UWD 470.

Individual weather strips 320*a*-320*e* are each received from spools prior to being joined via the apparatus 480. The joined and widened weather strip (Shown in FIG. 5) disengages from the rails 410*a*-410*f* at a location downstream of the ultrasonic welding device (UWD) 470, and wound around a discharge spool.

Note that the design of apparatus is an example of the concept of the invention, and such an apparatus 480 can be expanded to produce joined weather strips that are wider than shown here. For example, this same apparatus can be expanded to join 6, or 7, or 8, or 9 or 10 weather strips, just as an alternate example.

Although the description herein applies to polypropylene, the concept of the invention can apply to other types of plastic and materials that are suitable for welding. The invention reveals that a polypropylene backing layer that is substantially thinner than 30/1000 of an inch can enable the manufacturing of weather stripping that is more flexible than weather stripping having a typical 30/1000 inch thick backing layer, and even more useful when the backing layer of weather stripping can be joined to form wider weather strips. The invention can also be applied to thicker than 12.5/1000 inch backing layers, such as backing layers of 15/1000, 20/1000 or 30/1000 of an inch thickness or thicker. Also note that the joining of weather stripping is not limited to joining weather strips that have a same pile height. Weather strips having varying piles heights can be joined together via the method, system, and apparatus described herein.

FIG. 5 illustrates the joined weather strip 580 upon its discharge from the apparatus 480 of FIGS. 4A-4B. As shown, the joined weather strip 580 includes a joined backing layer 520, and the 15/1000 of an inch wide gaps 582*a*-582*d* appear in volumes of space once occupied by the rails 410*b*-410*e*. However, after discharge, the filaments horizontally fan out (bloom) into those narrow 15/1000 inch gaps to occupy almost the entirety of these gaps.

FIGS. 6A-6D illustrate a flexibility exercise/test for various embodiments of weather stripping (elongated dust plugs).

Figure 6A:
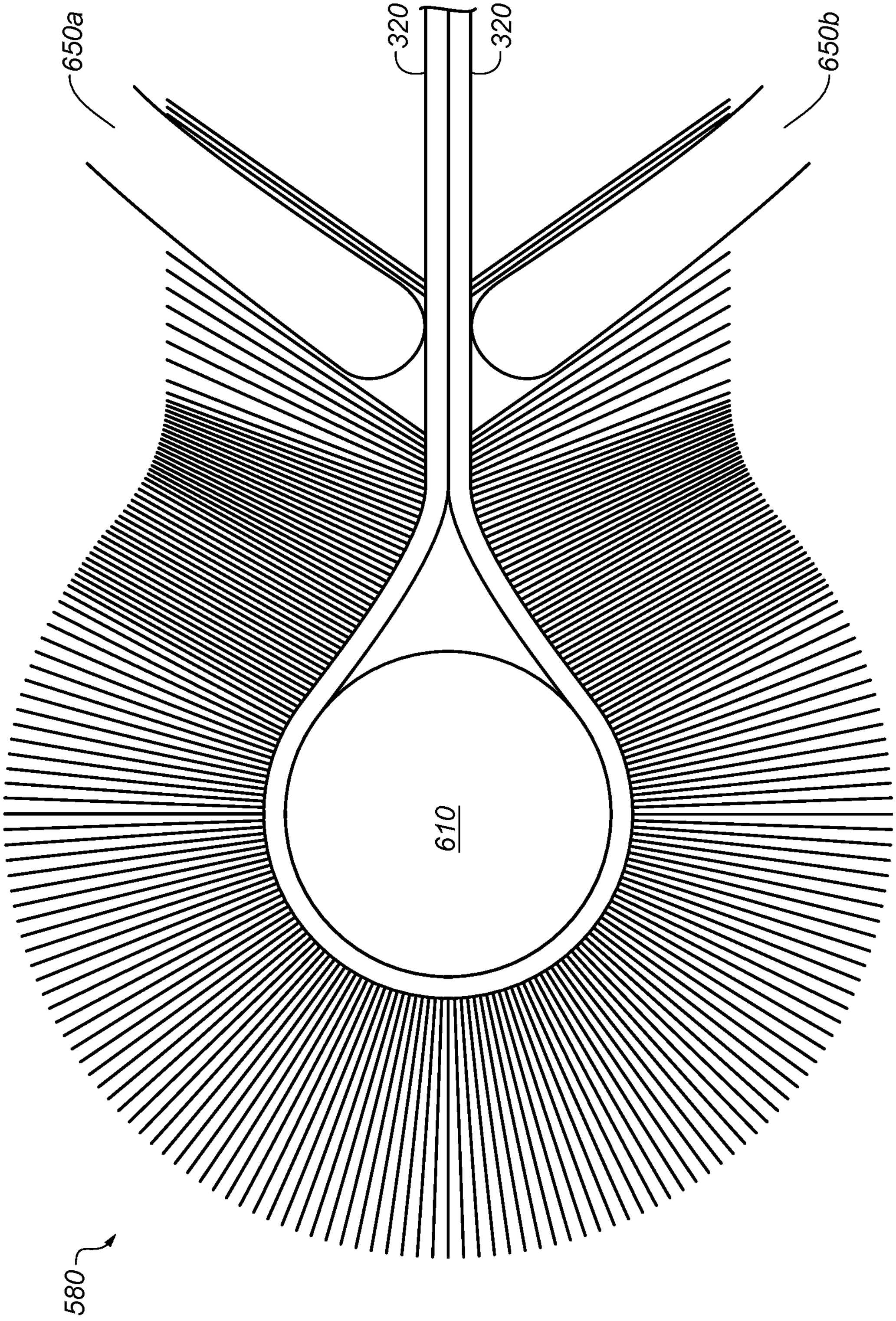
FIGS. 6A-6D illustrate a exercises (tests) for measuring flexibility of weather stripping and dust plugs.

FIG. 6A illustrates the wrapping of an elongated dust plug 580 around a cylinder 610 that is about 0.3125 inches in diameter. The elongated dust plug is more than 2 inches in length and more than 0.4 inches in width. Using an index finger 650*a* and a thumb finger 650*b* of a human hand, the elongated dust plug can make wrapping contact along at least 240 of 360 degrees of arc around the cylinder 610 while not leaving air gaps that are visible to the human eye, within that wrapping contact arc area, that might be formed between the backing layer 320 of the elongated dust plug 580 and the outer surface of the cylinder 610.

Note that in this exercise, the elongated dust plug 580 is oriented so that its length (long dimension) encircles a center axis of the cylinder 610, and its width dimension is parallel to the center axis of the cylinder, which is also parallel to the Z 170 axis as shown in this drawing.

This exercise is performed by applying a routine amount of finger strength, specifically being two pounds or less of force, between the index finger 650A and the thumb finger

650*b*, to cause the above described wrapping contact between the elongated dust plug 580 and the cylinder 610.

Notice that the elongated dust plug 580 can be rotated into another orthogonal direction, where its length (long dimension) is parallel to a center axis of the cylinder 610, and its width dimension encircles the center axis of the cylinder, which is also parallel to the Z axis, which is perpendicular the surface of a sheet of paper including this drawing.

In this exercise, using an index finger 650*a* and a thumb finger 650*b* of a human hand, the elongated dust plug also makes wrapping contact along an arc around the cylinder 610 while not leaving air gaps that are visible to the human eye, within that wrapping contact arc area, that might be formed between the backing layer 320 of the elongated dust plug 580 and the outer surface of the cylinder 610. In this exercise, the width dimension of the elongated dust plug does not entirely encircle the cylinder 610, but however, no air gaps are visible along the contact area between the backing layer 320 and the cylinder 610.

What the above exercise reveals is that, unlike many prior art dust plugs, the improved dust plug of the invention is designed so that it can be installed in multiple and different orthogonal orientations without creating unwanted air gaps which can cause degrading the air obstruction performance of the dust plug. This design feature simplifies and quickens dust plug installation and improves performance of the dust plug to enhance the quality of products within which the dust plug is installed.

Figure 6B:
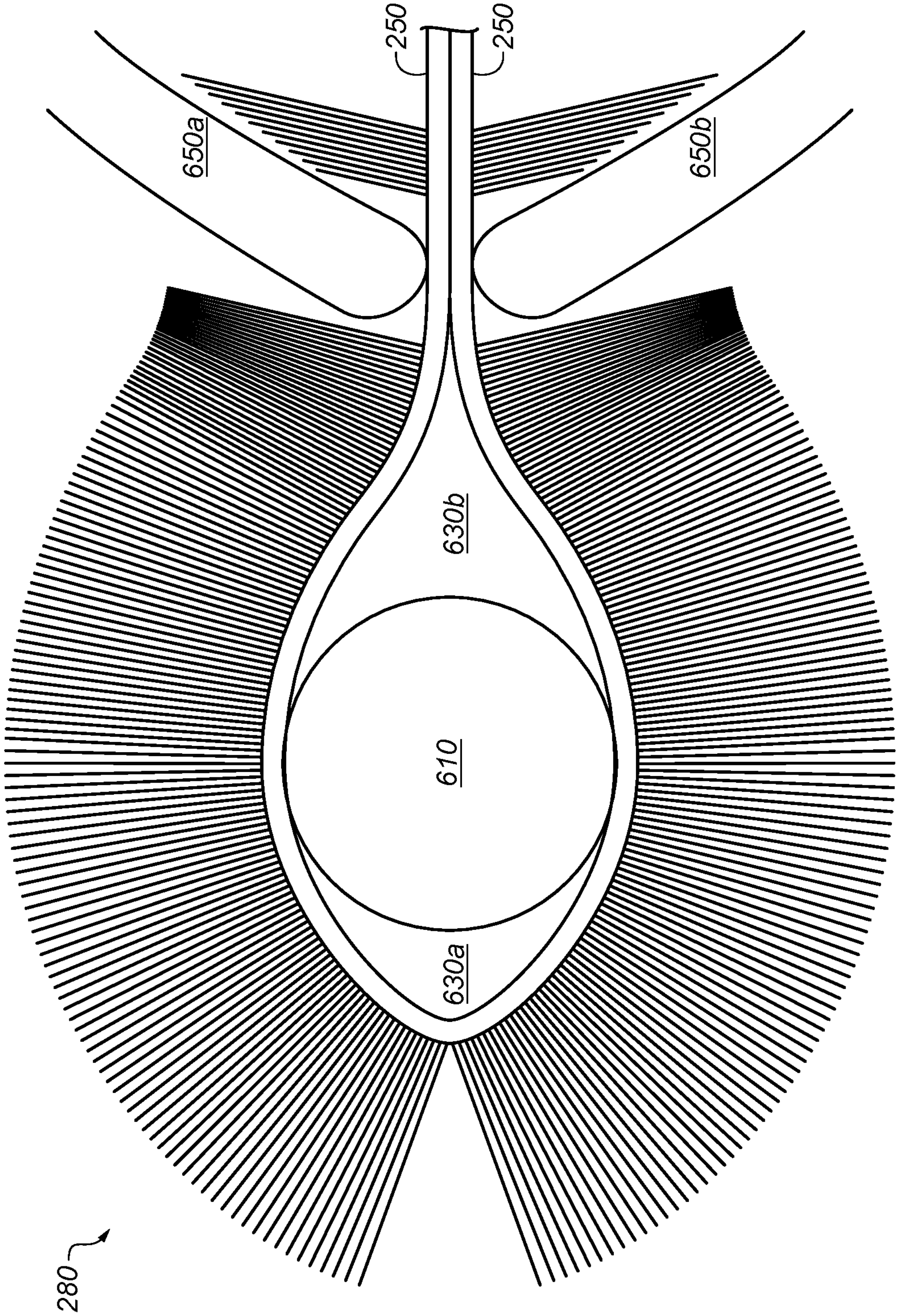

FIG. 6B illustrates the exercise of FIG. 6A between an elongated dust plug 280 of FIG. 2B and the cylinder 610 of FIG. 6A. The elongated dust plug 280 is more than 2 inches in length and more than 2 inches in width. Using an index finger 650*a* and a thumb finger 650*b* of a human hand, the elongated dust plug can NOT make wrapping contact along at least 240 of 360 degrees of arc around the cylinder 610 while not leaving air gaps 630*a*-630*b* that are visible to the human eye within that wrapping contact arc area, that might be formed between the backing layer 250 of the elongated dust plug 280 and the outer surface of the cylinder 610.

This exercise is performed by applying a maximum amount of finger strength, specifically being substantially more than two pounds of force, between the index finger 650A and the thumb finger 650*b*, to attempt to cause the wrapping contact between the elongated dust plug 280 and the cylinder 610, as described in association with FIG. 6A, along at least 240 of 360 degrees of arc around the outer surface of the cylinder 610.

Figure 6C:
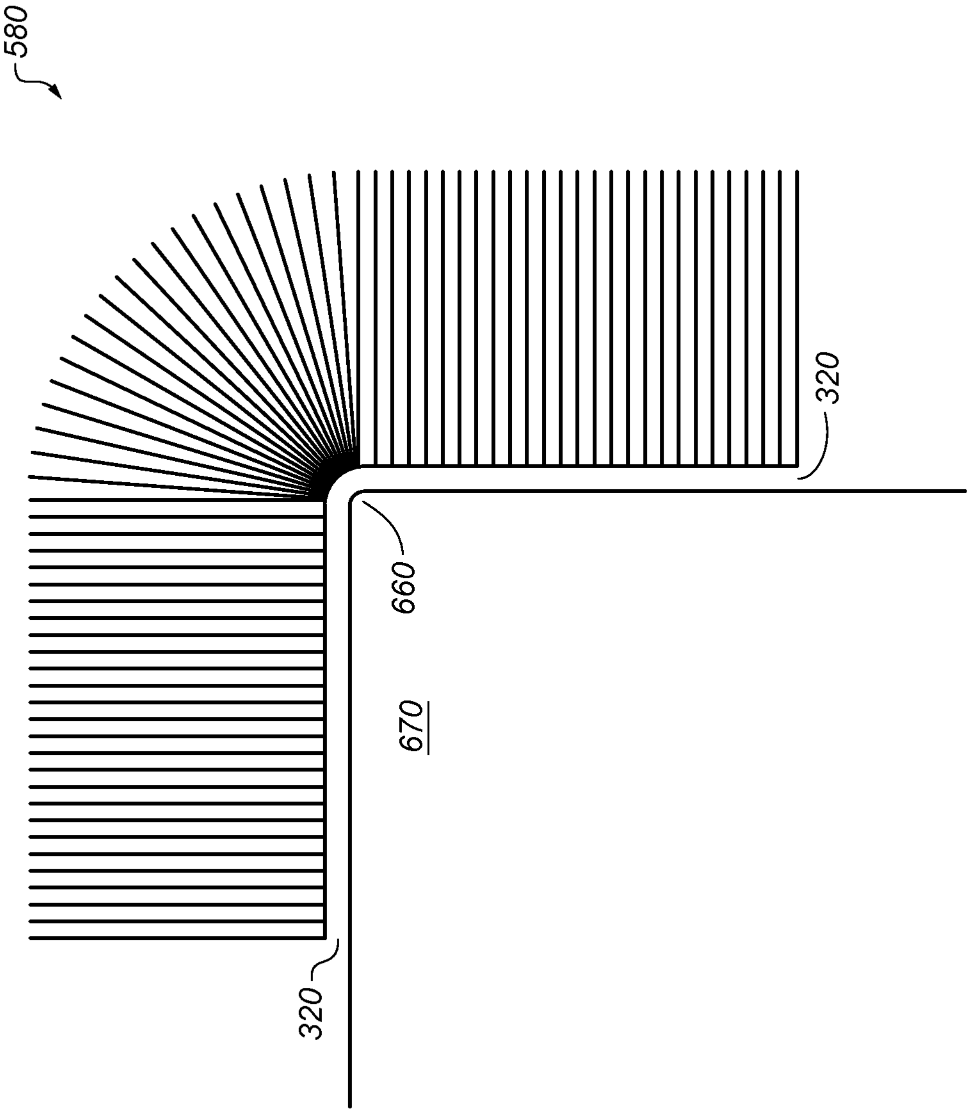

FIG. 6C illustrates the wrapping of an elongated dust plug 580 around a right angle edge 660. The right angle edge can be a corner of a table or solid block 470. The elongated dust plug is more than 2 inches in length and more than 0.4 inches in width. Using an index finger 650*a* and a thumb finger 650*b* of a human hand (not shown here), the elongated dust plug can make continuous wrapping contact on surfaces that are adjacent to and located within one inch of the right angle edge 660, and while not leaving air gaps that are visible to the human eye, within that wrapping contact arc area, that might be formed between the backing layer 320 of the elongated dust plug 580 and the outer surface of the right angle edge 660.

Note that in this exercise, the elongated dust plug 580 is oriented so that its length (long dimension) straddles the right angle edge 660, and its width dimension is parallel to the right angle edge 660, which is also parallel to the Z axis 170 as shown in this drawing.

This exercise is performed by applying a routine amount of finger strength, specifically being two pounds or less of force, between the index finger 650A and the thumb finger 650*b*, to cause the above described wrapping contact between the elongated dust plug 580 and the cylinder 610.

Notice that the elongated dust plug 580 can be rotated into another orthogonal direction, where its length (long dimension) is parallel to the right angle edge 660, and its width dimension straddles the right angle edge, which is also parallel to the Z axis, which is perpendicular the surface of a sheet of paper including this drawing.

In this exercise, using an index finger 650*a* and a thumb finger 650*b* of a human hand (not shown here), the elongated dust plug also makes wrapping contact along the right angle edge 660 while not leaving air gaps that are visible to the human eye, within that wrapping contact arc area, that might be formed between the backing layer 320 of the elongated dust plug 580 and the outer surface surrounding the right angle edge 660. In this exercise, the width dimension of the elongated dust plug is not large enough to span in a direction of one inch on either side of the right angle edge, but however, no air gaps are visible along the contact area between the backing layer 320 and the surface surrounding the right angle edge 660.

Figure 6D:
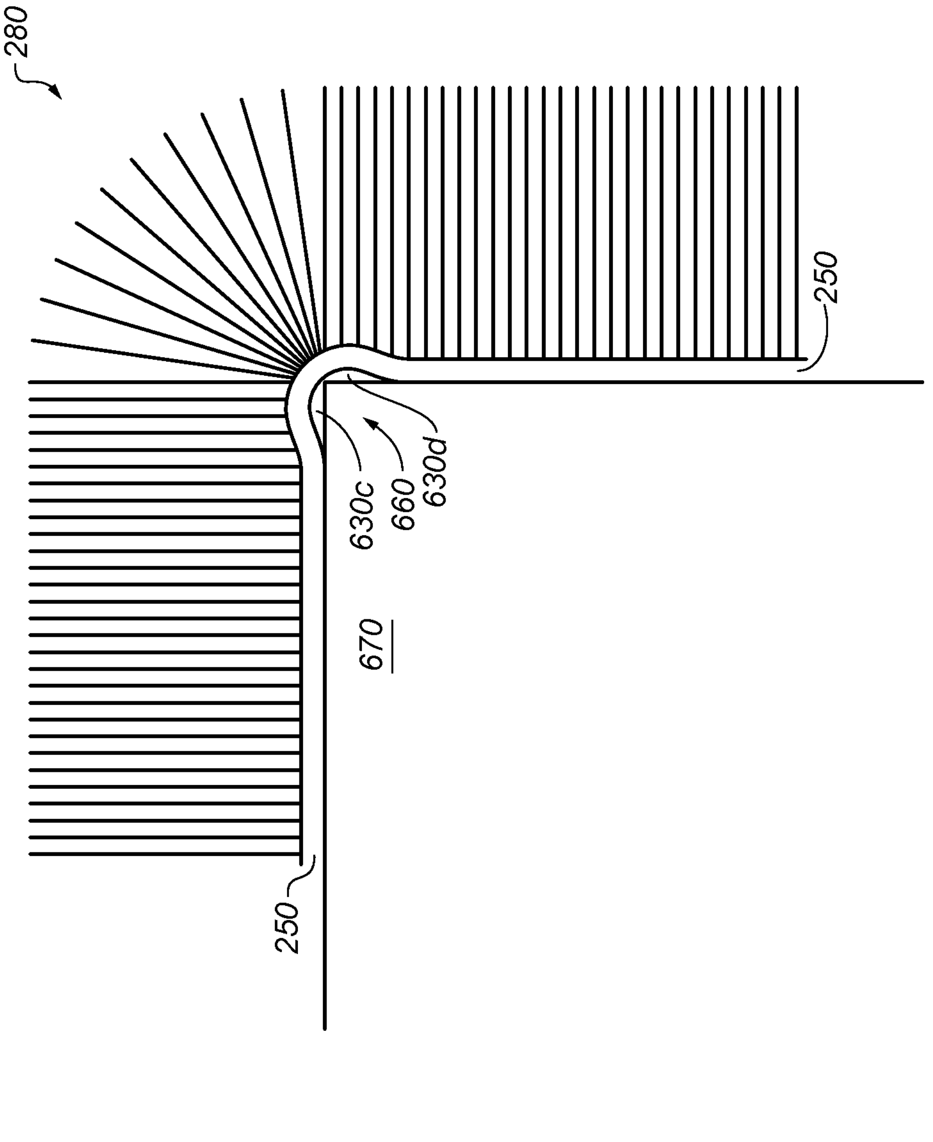

FIG. 6D illustrates the exercise of FIG. 6C between an elongated dust plug 280 of FIG. 2B and the right angle edge 660 of FIG. 6C. The elongated dust plug 280 is more than 2 inches in length and more than 2 inches in width. The long dimension of the dust plug 280 is oriented to straddle the right angle edge 660.

Using an index finger 650*a* and a thumb finger 650*b* of a human hand (not shown), the elongated dust plug can NOT be made to make continuous wrapping contact for a distance of one inch on both orthogonal surfaces that are adjacent to the right angle edge 660, and while not leaving air gaps 630*c*-630*d* that are visible to the human eye, within that wrapping contact area. Such air gaps 630*c*-630*d*, that might be formed between the backing layer 250 of the elongated dust plug 280 and the orthogonal surfaces that are adjacent to the right angle edge 660.

This exercise is performed by applying a substantial amount of finger strength, specifically being substantially more than two pounds of force, between the index finger 650A and the thumb finger 650*b*, to attempt to cause continuous wrapping contact between the elongated dust plug 280 and the surfaces that are adjacent to and located within one inch of the right angle edge 660, as described in association with FIG. 6C.

What the above exercises (tests) reveal is that, unlike known prior art dust plugs, the improved dust plug of the invention is designed with sufficient flexibility so that it can be installed in multiple and different orthogonal orientations without creating unwanted air gaps caused from stiffness of the backing layer, or caused by large corn rows, which can cause degrading of the air obstruction performance of the dust plug. This design feature simplifies and reduces time for dust plug installation and improves performance of the dust plug after installation to enhance the quality of products within which the dust plug is installed.

FIG. 7 illustrates manufactured weather stripping in accordance with the invention. As shown, individual piles of filaments (filament piles) are attached to a backing strip 720 and abut each other and form corn rows 730*a*-730*g* along an upper surface of the backing strip 720. A portion of each filament pile 732*a*-732*h* is shown to intersect at least one adjacent filament pile 732*a*-732*h* within a volume of space 740*a*-740*g*. Within each volume of space 740*a*-740*g*, filaments are actually pressing and pushing against neighboring filaments, causing more dense clustering (packing) of filaments within each marked volume of space 740*a*-740*g*.

This dense filament clustering enables the improved weather stripping of the invention to remain fuller during bending (when bent), for example, around a 90 degree corner, as shown in FIG. 6C. When a portion of the improved weather stripping is installed into a crevice (tight volume of space) the increased density of filament clustering, causes the filaments to become less sparse (remain more dense) while bending around arcs and corners, than other known prior art weather stripping. As a result, the improved weather stripping of the invention provides for substantially improved resistance to (obstruction of) infiltration of air and particulates, dust or light, as compared to the known prior art.

Furthermore, such increased density of filaments, provided by smaller corn rows and increased density of filament clustering, remains after a portion of this improved weather stripping is compressed into a tight volume of space. In other words, the such improved resistance to (obstruction of) infiltration of air and particulates, dust or light, as compared to the known prior art, remains when the improved weather stripping is undergoing compression, and specifically when undergoing at least as much as 25% compression with respect to an installed volume of weather stripping, relative to the volume of that weather stripping is uninstalled.

Also, a corn row 730*a*-730*g*, being a volume of space that is void of filaments, is formed between adjacent filament piles 732*a*-732*h*. In some embodiments, each corn row 730*a*-730*g* has a maximum width dimension, as measured along the Z axis 170, equal to 0.025 inches, and has a maximum height dimension, as measured along the Y axis 160, equal to 0.070 inches. The size of these corn rows, in terms of cross-section with respect to the Y-Z plane, is substantially smaller than that of the known prior art, as shown in FIGS. 1A-1B.

The cross-sectional area, with respect to the plane defined by the Y 160 and Z 170 axes, of one of the above described corn rows 732*a*-732*h*, of FIG. 7, occupies (0.070*(0.025/2) =0.000875 square inches. The cross-sectional area of one of the corn rows 130*a*-130*b*, of FIG. 1A, occupies (0.15*(0.15/2)=0.01125 square inches. The cross-sectional area of one of the corn rows 150*a*-150*c*, of FIG. 1B, occupies (0.225*(0.165/2)=0.0185625 square inches.

As a result, each of the corn rows 130*a*-130*b* of FIG. 1A, occupies more than (12) times the cross-sectional area of each of the corn rows 732*a*-732*h* of FIG. 7. Also, each of the corn rows 150*a*-150*c* of FIG. 1B occupies more than (21) times the cross-sectional area of each of the corn rows 732*a*-732*h* of FIG. 7. These differences result in substantial and measurable improvement with respect to obstruction of the intrusion of air and particulates, water, and light through the installed weather stripping of the invention of FIG. 7, in relation to the prior art weather stripping of FIGS. 1A-1B.

Like shown in FIGS. 6A and 6C, the embodiment shown has a flexible backing layer 720. This flexible backing layer includes a sub-layer 720*a* which is manufactured as shown in FIG. 5. Optionally, and additional binding layer 720*b*, also referred to as an adhesive layer 720*b*, can be attached to layer 720*a* to provide additional structural support to the backing layer 720 as a whole. The binding layer is generally $^{10}/_{1000}$ inches or less in thickness.

Regardless of whether an additional binding layer 720*b* is included in the manufactured weather strip as shown, the weather strip 710 provides for substantially improved resistance to infiltration of air, dust or light, as compared to the known prior art.

In some embodiments, the backing strip is made from a polypropylene fabric (PF), which is made in a woven or non-woven form. Woven PF is manufactured by pressing long strings of polypropylene molecules (polymers) together to make a thread-like strip, and then weaving strips into a fabric. Non-woven PF has a consistent textured appearance that is void of a woven appearance. Preferably, a non-woven PF is employed as a backing layer 720*a* and optionally 720*b*.

In other embodiments, materials other than polypropylene can employed as filament and/or backing material, provided that such materials can be welded (fused) to each other. For example, nylon filaments can be welded onto a backing made of nylon material. Preferably, the backing layer is made from a non-woven nylon fabric. However, a backing layer from other forms of nylon, such as a woven nylon fabric, can be employed.

This written description uses example embodiments to disclose the invention, to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An article of weather stripping designed for providing obstruction to a flow of air and particulates, comprising:

a pile of yarn or filaments that is made at least in part from a first polymer, being polypropylene;

a backing layer that is made from a non-woven polypropylene film; said backing layer having two opposing sides and being a non-woven polypropylene fabric that is extrusion coated with a layer of polypropylene (PP) on at least one of said two opposing sides; and wherein said non-woven polypropylene film is no more than $^{15}/_{1000}$ of an inch in thickness;

said yarn or filaments being attached to said backing layer via ultrasonic welding of said yarn or filaments to said backing layer, said yarn or filaments being attached to one of said two opposing sides of said backing layer; and wherein said backing layer including at least one pile attachment section having a width dimension and further including at least two pile non-attachment sections each having a width dimension, two of said pile non-attachment sections being located adjacent to and at opposite sides of said at least one pile attachment section, and wherein a summation of said width dimension of each of any two pile non-attachment sections that are adjacent to said at least one pile attachment section, is not greater than said width dimension of said pile attachment section.

2. The article of claim 1 wherein a first portion of a first backing layer of a first weather strip is joined with at least a second portion of a second backing layer of a second weatherstrip, to form at least a portion of said backing layer.

3. The article of claim 1 wherein a width of said first pile attachment section is larger than a width of at least an adjacent one of said second pile non-attachment sections by a factor of 2 or more.

4. The article of claim 1 wherein a width of said first pile attachment section is larger than a width of at least an adjacent one of said second pile non-attachment sections by a factor of 3 or more.

5. The article of claim 1 wherein said first pile attachment section is larger than a width of at least an adjacent one of said second pile non-attachment sections by a factor of 5 or more.

6. The article of claim 2 wherein said first backing layer and said second backing layer each have a thickness that is less than or equal to 15/1000 of an inch.

7. The article of claim 1 wherein said pile has a height that is greater than 200/1000 of an inch.

* * * * *